(12) United States Patent
Branscomb

(10) Patent No.: US 8,709,246 B2
(45) Date of Patent: Apr. 29, 2014

(54) FILTER CARTRIDGE AND SYSTEM USING LINEAR ACTUATION

(75) Inventor: Matt R. Branscomb, Lakeville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 416 days.

(21) Appl. No.: 13/119,286

(22) PCT Filed: Sep. 15, 2009

(86) PCT No.: PCT/US2009/056879
§ 371 (c)(1),
(2), (4) Date: Mar. 16, 2011

(87) PCT Pub. No.: WO2010/033470
PCT Pub. Date: Mar. 25, 2010

(65) Prior Publication Data
US 2011/0174705 A1    Jul. 21, 2011

Related U.S. Application Data

(60) Provisional application No. 61/097,348, filed on Sep. 16, 2008.

(51) Int. Cl.
*B01D 27/00* (2006.01)
(52) U.S. Cl.
USPC .......................................... 210/232; 210/429
(58) Field of Classification Search
USPC .......... 210/232, 416.3, 429, 440; 62/318, 338
See application file for complete search history.

(56) References Cited

U.S. PATENT DOCUMENTS

| | | | |
|---|---|---|---|
| 3,166,500 A | 1/1965 | Noakes et al. |
| 3,272,340 A | 9/1966 | Hungerford, Jr. |
| 3,954,624 A | 5/1976 | Petrucci |
| 4,420,396 A | 12/1983 | Yamamoto et al. |
| 4,515,692 A | 5/1985 | Chandler et al. |
| 4,559,136 A | 12/1985 | Dockery |
| 4,645,601 A | 2/1987 | Regunathan et al. |

(Continued)

FOREIGN PATENT DOCUMENTS

| | | |
|---|---|---|
| DE | 10066092 | 2/2007 |
| JP | 2002-102846 A | 4/2002 |

(Continued)

OTHER PUBLICATIONS

Supplementary European Search Report for EP 09815038, completed Jan. 13, 2012.

(Continued)

*Primary Examiner* — Fred Prince
(74) *Attorney, Agent, or Firm* — Scott A. Baum

(57) ABSTRACT

A filter cartridge for a filtration system including an outer shell having a first end and a second end, an inlet and an outlet located on the first end, and at least one cam track located on the outer shell. The cam track including a first opposing surface and a second opposing surface forming a channel having an entry portion and an exit portion. The first opposing surface including a locating detent. The second opposing surface including a first advancing cam positioned before an indexing stop and a second advancing cam positioned after the indexing stop in a direction of travel from the entry portion to the exit portion.

23 Claims, 9 Drawing Sheets

(56) References Cited

U.S. PATENT DOCUMENTS

| | | |
|---|---|---|
| 4,731,183 A | 3/1988 | Schumacher, II |
| 4,735,716 A | 4/1988 | Petrucci et al. |
| 4,806,240 A | 2/1989 | Giordano et al. |
| 4,825,903 A | 5/1989 | Ochs et al. |
| 4,857,189 A | 8/1989 | Thomsen et al. |
| 4,857,191 A | 8/1989 | Wolf |
| 4,871,455 A | 10/1989 | Terhune et al. |
| 4,904,382 A | 2/1990 | Thomsen |
| 4,943,175 A | 7/1990 | Heim |
| 4,956,086 A | 9/1990 | Thomsen et al. |
| 5,035,797 A | 7/1991 | Janik |
| 5,098,559 A | 3/1992 | Mack et al. |
| RE34,031 E | 8/1992 | Thomsen et al. |
| 5,180,015 A | 1/1993 | Ringgenberg et al. |
| 5,186,829 A | 2/1993 | Janik |
| 5,354,464 A | 10/1994 | Slovak et al. |
| 5,486,288 A | 1/1996 | Stanford et al. |
| 5,560,824 A | 10/1996 | Sann et al. |
| 5,630,935 A | 5/1997 | Treu |
| 5,700,371 A | 12/1997 | Koslow |
| 5,709,795 A | 1/1998 | Park et al. |
| 5,766,463 A | 6/1998 | Janik et al. |
| 5,826,854 A | 10/1998 | Janvrin et al. |
| 5,837,137 A | 11/1998 | Janik |
| 6,120,685 A | 9/2000 | Carlson et al. |
| RE37,216 E | 6/2001 | Koslow |
| 6,251,273 B1 | 6/2001 | Jawurek et al. |
| 6,360,764 B1 | 3/2002 | Fritze |
| 6,458,269 B1 | 10/2002 | Bassett et al. |
| 6,517,615 B2 | 2/2003 | Miller et al. |
| 6,555,000 B2 | 4/2003 | Knight |
| 6,632,355 B2 | 10/2003 | Fritze |
| 6,716,348 B1 | 4/2004 | Morgan |
| 7,000,894 B2 | 2/2006 | Olson et al. |
| 7,056,435 B2 | 6/2006 | Jenkins et al. |
| 7,067,054 B2 | 6/2006 | Fritze |
| 7,147,773 B2 | 12/2006 | Mitchell et al. |
| 7,442,301 B2 | 10/2008 | Huda |
| 2003/0042191 A1 | 3/2003 | Nam et al. |
| 2003/0178354 A1* | 9/2003 | Wall .................... 210/232 |
| 2004/0182777 A1 | 9/2004 | Stankowski et al. |
| 2005/0092183 A1 | 5/2005 | Koslow et al. |
| 2005/0252841 A1 | 11/2005 | Bassett et al. |
| 2006/0186031 A1 | 8/2006 | Fick et al. |
| 2007/0012611 A1 | 1/2007 | An |
| 2007/0199876 A1 | 8/2007 | Tubby et al. |
| 2007/0227959 A1 | 10/2007 | Sinur et al. |
| 2008/0047889 A1 | 2/2008 | Huda |
| 2008/0142425 A1 | 6/2008 | Hansen |
| 2010/0018912 A1 | 1/2010 | Wawrla et al. |
| 2011/0192782 A1 | 8/2011 | Tubby et al. |

FOREIGN PATENT DOCUMENTS

| | | |
|---|---|---|
| JP | 2004531392 | 10/2004 |
| WO | WO 98/08012 | 2/1998 |
| WO | WO 01/95993 | 12/2001 |
| WO | WO 2005/061073 | 7/2005 |
| WO | WO 2007/012079 | 1/2007 |

OTHER PUBLICATIONS

PCT International Search Report for WO 2007/012079, published Sep. 20, 2007.

PCT International Search Report for PCT/US2009/056879, mailed Apr. 23, 2010.

* cited by examiner

FILTER CARTRIDGE AND SYSTEM USING LINEAR ACTUATION

CROSS REFERENCE TO RELATED APPLICATIONS

This application is a national stage filing under 35 U.S.C. 371 of PCT/US2009/056879, filed Sep. 15, 2009, which claims priority to U.S. Provisional Application No. 61/097,348, filed Sep. 16, 2008, the disclosure of which is incorporated by reference in its/their entirety herein.

BACKGROUND

Filter cartridges are used in a wide variety of applications to filter various liquids such as water. Filter cartridges, especially filter cartridges used to filter water in refrigerators, can be attached to a manifold using a quick disconnect system for easy replacement of the filter cartridge when necessary. Often, the quick disconnect system uses one or more lugs extending from the filter cartridge that mate with corresponding recesses in the manifold. To install a new filter cartridge, the lugs are aligned with the recesses and the filter cartridge is then rotated clockwise to lock the filter cartridge into position. To unlock the filter cartridge, the filter cartridge is rotated counter-clockwise. One issue with the above described system is that sufficient clearance must be provided around the filter cartridge in order to enable a user to grasp and rotate the filter cartridge in both directions when removing and installing a new filter cartridge. In some applications, sufficient space for a user's hand and/or fingers is not present around the filter cartridge for generating the required torque which prevents utilization of the twist and lock style filter system.

A straight line push/pull filter cartridge system is disclosed in U.S. patent publication number 2007/0199876 dated Aug. 20, 2007 by Tubby. Such a system works well in applications where insufficient clearance is present to use the twist and lock style system that requires filter cartridge rotation. In the straight line push/pull system, the filter cartridge does not rotate during insertion or removal and the filter cartridge is guided in a linear motion. The push/pull filter cartridge system uses rotating latches to secure the filter cartridge to the manifold. One issue with the straight line push/pull filter cartridge system is the complexity of the rotating latches and the inherent cost of producing such a filter cartridge system.

SUMMARY

The present disclosure overcomes the above issues by utilizing a filter cartridge system that converts linear force into rotational motion to advance and secure the filter cartridge onto the manifold. Once installed in the service position, additional linear force causes the filter cartridge to release and continue rotating in the same direction to remove the filter cartridge from the manifold. Unlike the straight line push/pull filter cartridge system, the present invention uses lugs and a cam track thereby greatly simplifying the complexity and reducing the cost.

In the present disclosure, only the end of the filter cartridge needs to be accessible in order to install and remove a new filter cartridge. By pushing on the end of the filter cartridge, the filter cartridge is advanced and rotated into the service position. When the filter cartridge is released, it is locked into the service position. By pushing on the end of the filter cartridge a second time, the filter cartridge is advanced and rotated in the same direction as during installation as it is released from the service position.

Hence in one embodiment, the invention comprises a filter cartridge for a filtration system including an outer shell having a first cartridge end and a second cartridge end, an inlet and an outlet located on the first cartridge end, and at least one cam track located on the outer shell. The cam track including a first opposing surface and a second opposing surface forming a channel having an entry portion and an exit portion. The first opposing surface including a locating detent. The second opposing surface including a first advancing cam positioned before an indexing stop and a second advancing cam positioned after the indexing stop in a direction of travel from the entry portion to the exit portion.

In another embodiment, the invention comprises a filter system including a filter cartridge and a manifold. The filter cartridge including an outer shell having a first cartridge end and a second cartridge end, and a stem attached to the first cartridge end. The manifold including a valve assembly in fluid communication with the stem and a coupling block having a receiving bore with an interior surface such that the receiving bore surrounds at least a portion of the outer shell. At least one indexing lug located on either the interior surface or the outer shell and a corresponding cam track located on the outer shell or the interior surface. The at least one cam track including a first opposing surface and a second opposing surface forming a channel having an entry portion and an exit portion. The first opposing surface including a locating detent. The second opposing surface including a first advancing cam positioned before an indexing stop and a second advancing cam positioned after the indexing stop in a direction of travel from the entry portion to the exit portion.

DESCRIPTION OF THE DRAWINGS

It is to be understood by one of ordinary skill in the art that the present discussion is a description of exemplary embodiments only, and is not intended as limiting the broader aspects of the present invention, which broader aspects are embodied in the exemplary construction.

Figure 1:
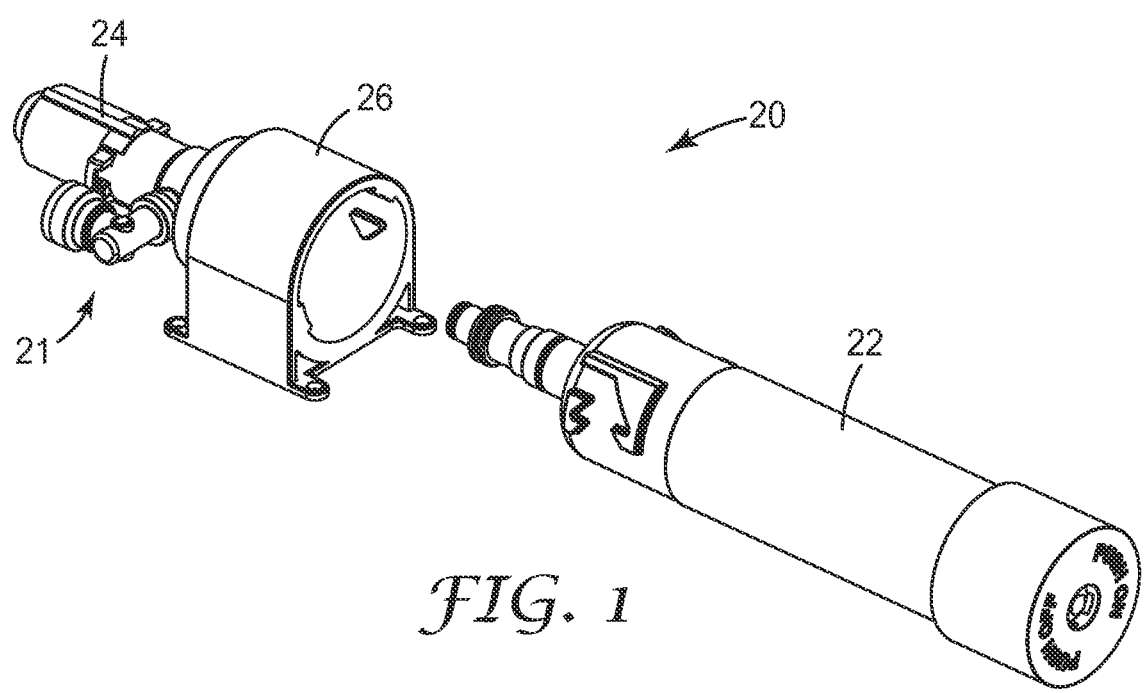
FIG. 1 is a perspective view of a filter cartridge and a manifold.
Figure 2:
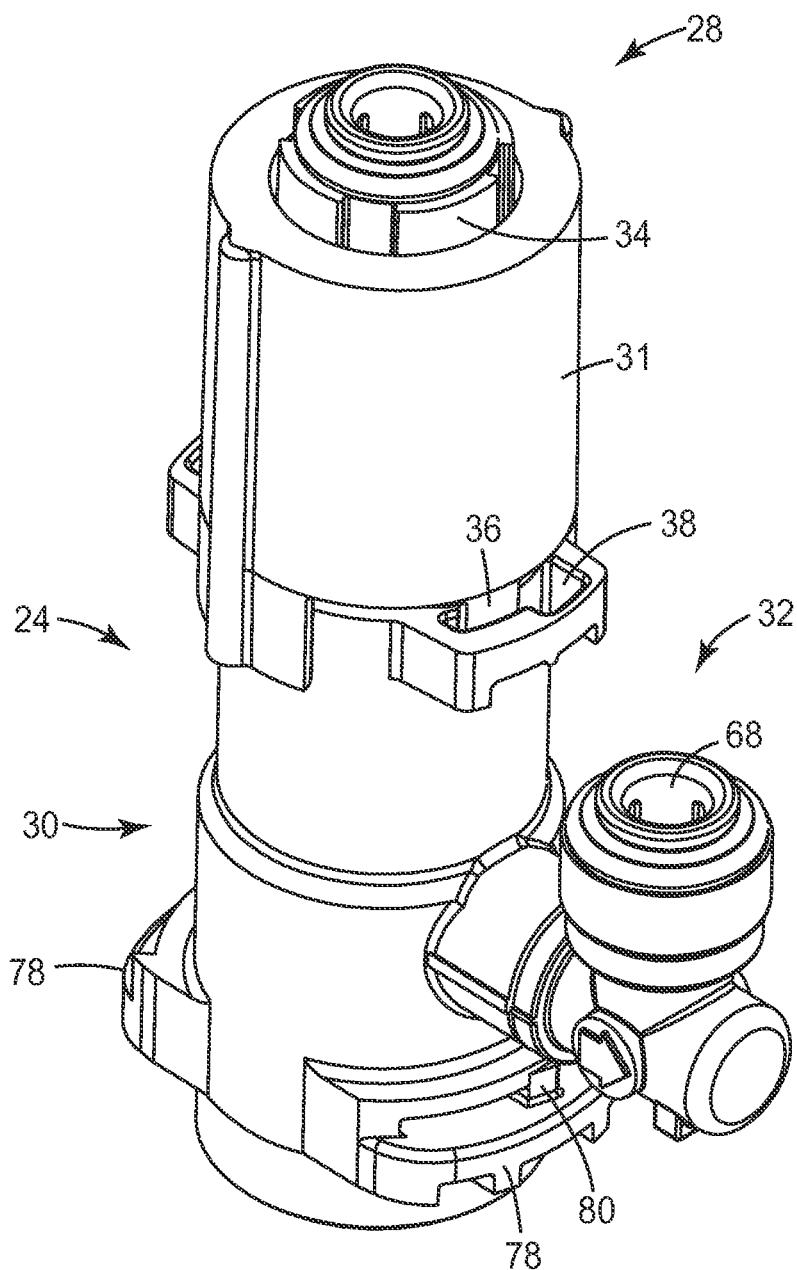
FIG. 2 is a perspective view of a valve assembly.
Figure 3:
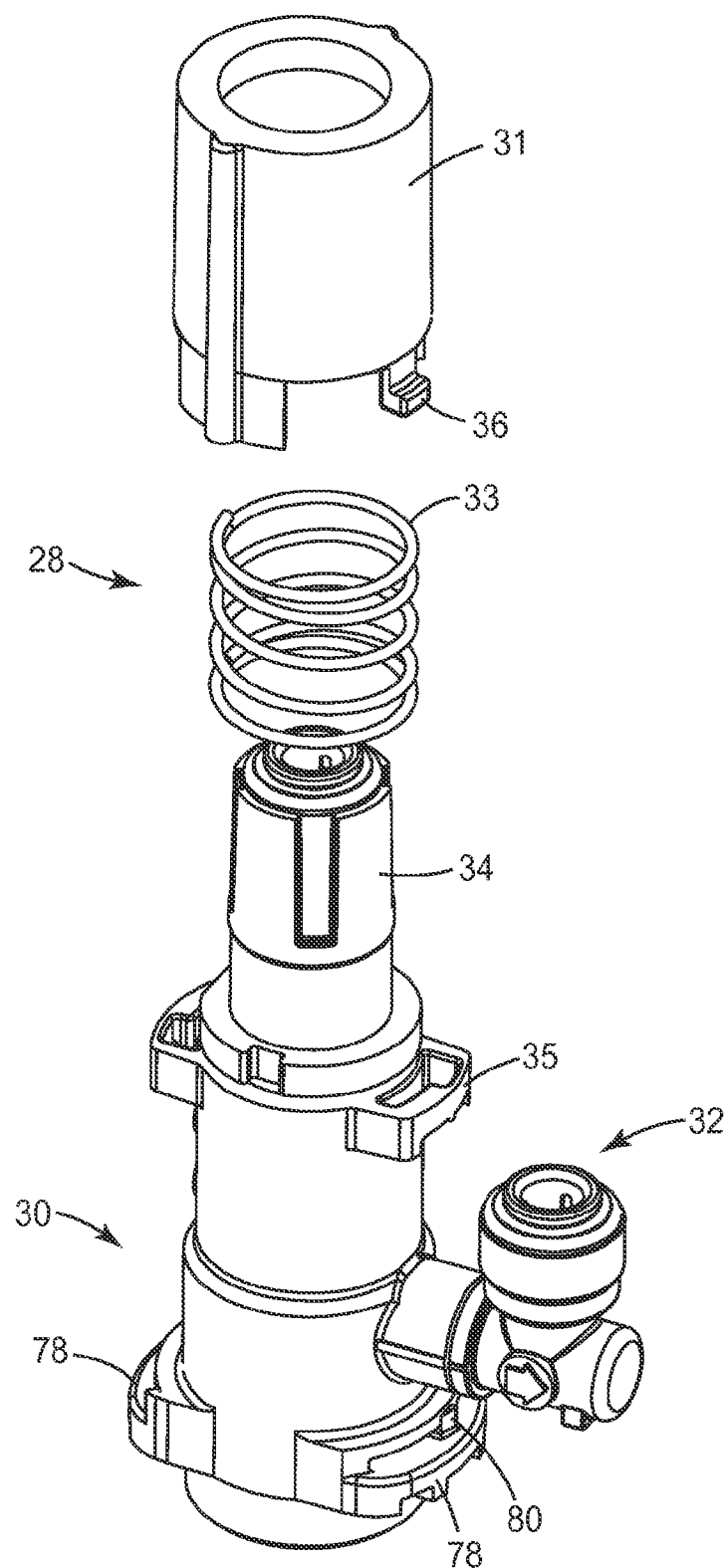
FIG. 3 is another perspective view of the valve assembly.
Figure 4:
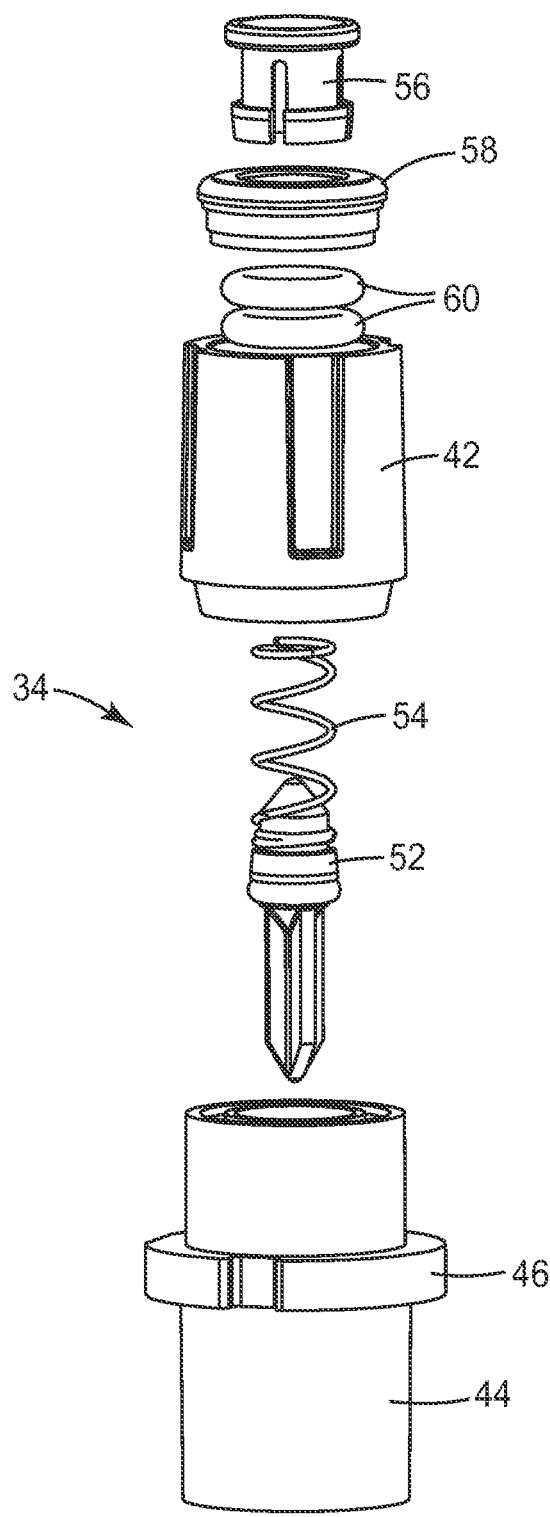
FIG. 4 is a perspective view of a valve cartridge.
Figure 5:
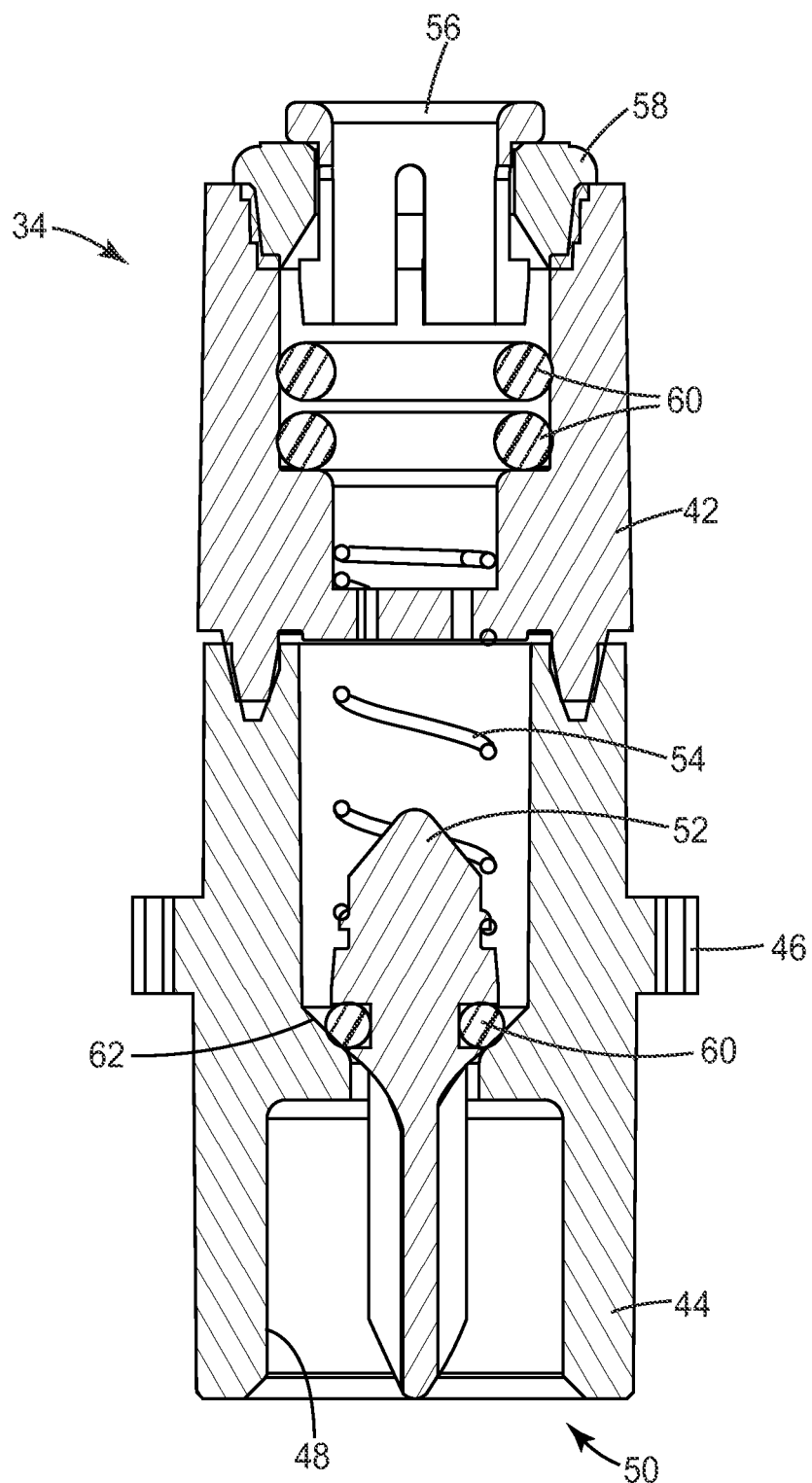
FIG. 5 is a cross section of the valve cartridge.
Figure 6:
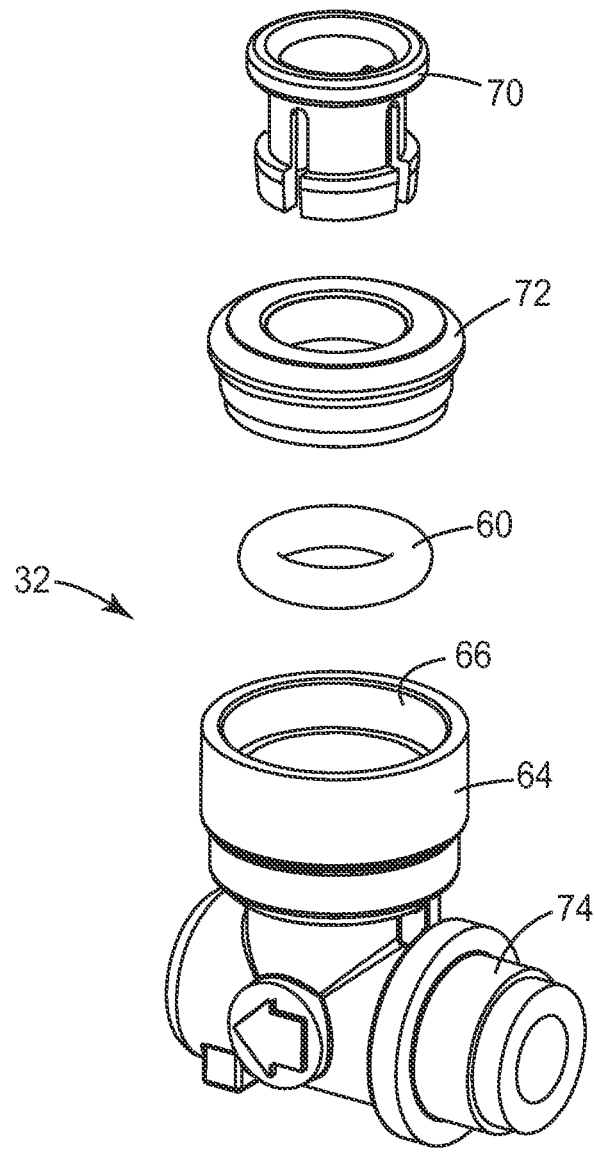
FIG. 6 is a perspective view of the outlet assembly.
Figure 7:
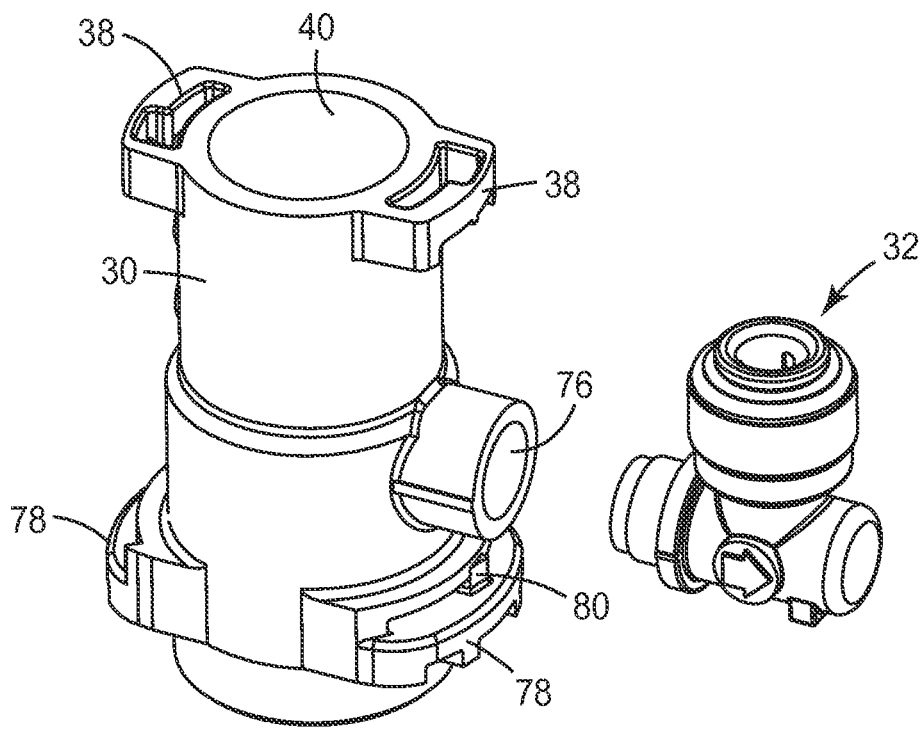
FIG. 7 is a perspective view of the valve body and outlet assembly.

Repeated use of reference characters in the specification and drawings is intended to represent the same or analogous features or elements of the invention.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

DETAILED DESCRIPTION

Referring to FIG. 1, a liquid filtration assembly 20 is shown. The filtration assembly 20 includes a manifold 21 and a filter cartridge 22. The filtration assembly 20 utilizes a quick disconnect system in order to enable the filter cartridge 22 to be quickly replaced by a user without the need for tools. The manifold 21 includes a valve assembly 24 in liquid communication with the filter cartridge 22 for routing fluids into and out of the filter cartridge 22 and for shutting off the incoming fluid flow during the filter cartridge 22 replacement. The manifold 21 also includes a coupling bracket 26 for coupling the filter cartridge 22 to the manifold 21 and for mounting the filtration assembly 20 to a suitable surface.

Valve Assembly

Various valve assemblies 24 known to those of skill in the art can be used with the filtration assembly 20. In one embodiment, the valve assembly 24 as illustrated in FIGS. 2-7 is utilized. The valve assembly 24 comprises three sections: the inlet assembly 28, the valve body 30 and the outlet assembly 32. The relationship of these three subcomponents controls the flow of fluid, such as water, into and out of the filter cartridge 22.

The inlet assembly 28 comprises a removable cap 31 and a compression spring 33 that fits over one end of a valve cartridge 34 that is secured by the cap 31 to the valve body 30. The cap 31 includes a pair of retaining tabs 36 located on opposite sides of the cap 31 which mate with a pair of notched slots 38 on the valve body 30. To attach the cap 31, the tabs 36 are aligned and passed through the notches and the cap 31 is rotated until the tabs 36 are secured in the slot portion of the notched slots 38. Once the cap 31 is secured, the compression spring 33 biases the valve cartridge 34 away from the cap 31 and into a central bore 40 of the valve body 30. The valve cartridge 34 will traverse up and down in the central bore 40 as the filter cartridge 22 is installed into and removed from the manifold 21. In this manor, the compression spring 33 also biases the filter cartridge 22 and assists in removing the filter cartridge 22 from the manifold 21.

The valve cartridge 34 includes a valve cartridge cap 42, a valve cartridge body 44 with a mounting flange 46 and an outlet bore 48 forming one-half of an inlet connector 50 for the filter cartridge 22, a poppet valve 52, a poppet valve spring 54, a collet 56, a collet retainer 58, and sealing rings 60. Generally, the valve cartridge cap 42 is welded or permanently affixed to the valve cartridge body 44 forming a single replaceable unit. A liquid supply tube can be inserted into the collet 56 through the valve cartridge cap 42 and sealed to the valve cartridge 34 by the sealing rings 60 while being retained in position by the collet 56. Similarly, the valve cartridge body 44 can be sealed to the central bore 40 by sealing rings 60 to prevent leaks as the valve cartridge 34 translates within the central bore 40. Lastly, a sealing ring 60 can be positioned between the poppet valve 52 and a valve seat 62 in the valve cartridge body 44.

The outlet assembly 32 includes an outlet body 64 having a body outlet bore 66 forming an outlet connector 68. A second collet 70, a second collet retainer 72, and a sealing ring 60 are positioned in the body outlet bore 66 for attaching an outlet supply tube to the outlet assembly 32. The outlet assembly 32 also includes a locating collar 74 that fits into a valve body outlet bore 76 in the valve body 30. Generally, the outlet body 64 is welded or permanently affixed to the valve body outlet bore 76.

The valve body 30 also includes a pair of securing tabs 78 located on opposite sides of the body's lower end and a pair of locking flanges 80 located above each securing tab. The securing tabs 78 are insertable into a first end 82 of the coupling bracket 26. The valve body 30 is then rotated approximately 180 degrees which engages the locking flanges 80 with the first end 82. Once engaged, the valve body 30 is designed to not be removable from the coupling bracket 26 unless the locking flanges 80 are damaged or rendered inoperable.

Coupling Bracket

Figure 8:
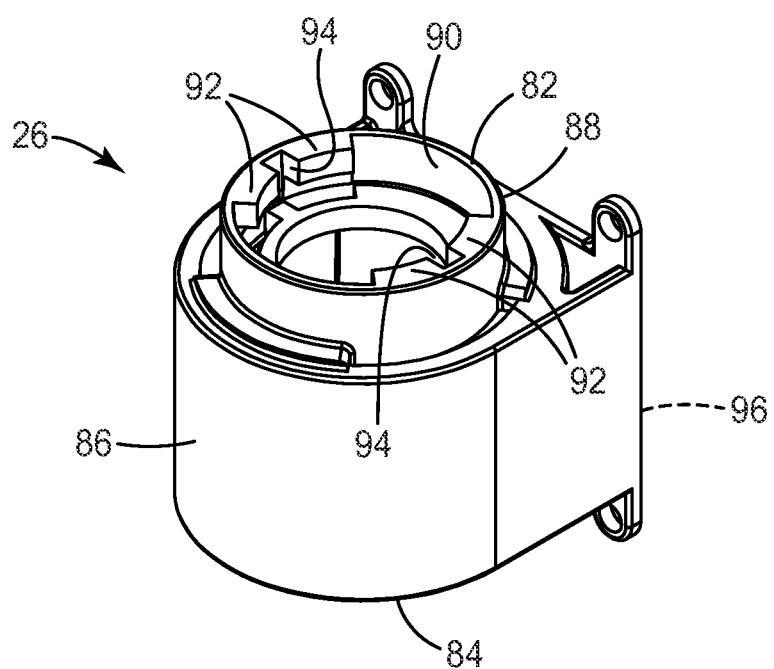
FIG. 8 is a perspective view of the coupling bracket.
Figure 9:
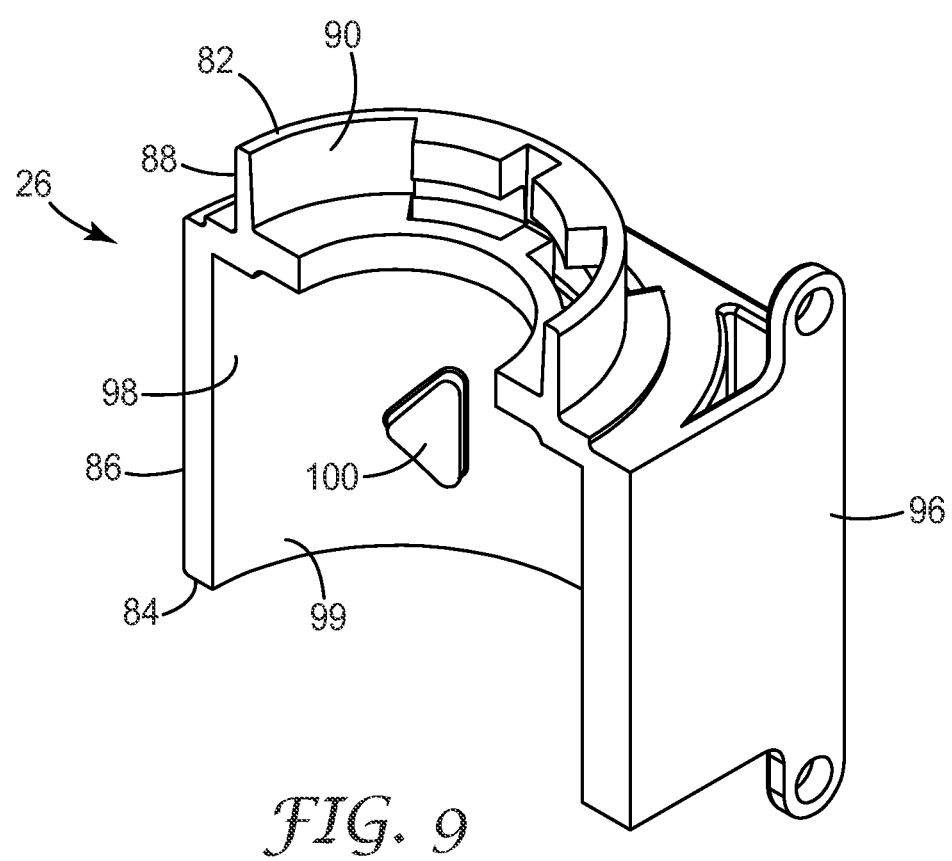
FIG. 9 is a cross section of the coupling bracket.

Referring to FIGS. 8 and 9, the coupling bracket 26 includes the first end 82, a second end 84, and a sidewall 86. The first end 82 includes a collar 88 having a centering bore 90. Projecting from the centering bore 90 are a plurality of valve assembly retaining flanges 92. In one embodiment, two valve assembly retaining flanges 92 separated by a recess 94 are located on each side of the centering bore 90 approximately 180 degrees apart. To secure the valve assembly 24 to the coupling bracket 26, the lower end of the valve assembly 24 is positioned into the centering bore 90. As the valve body 30 is rotated, the securing tabs 78 are forced under the valve assembly retaining flanges 92. When the securing tabs 78 align with the recesses 94, the locking flanges 80 snap into the recesses 94 preventing additional rotation of the valve body 30 and preventing its removal from the coupling bracket 26.

The sidewall 86 of the coupling bracket 26 is generally circular and includes a planar mounting surface 96 for attaching the coupling bracket 26 to another surface. Alternative sidewall 86 configurations are possible depending on the characteristics of the surface to which the coupling bracket 26 is intended to be attached.

The second end 84 of the coupling bracket 26 includes a receiving bore 98 for guiding the filter cartridge 22 into the coupling bracket 26. In one embodiment, disposed on an interior surface 99 of the receiving bore 98 are one or more indexing lugs 100 that project from the interior surface 99. The indexing lugs 100 engage with one or more corresponding cam tracks 102 on the filter cartridge 22 for advancing and rotating the filter cartridge 22 into its service or operating position. The indexing lugs 100 can have any suitable cross-sectional shape such as circular, oval, triangular, or rectangular. In one embodiment, the indexing lugs 100 comprised an equilateral triangular shape with rounded corners. In one embodiment, two index lugs are located 180 degrees apart on the interior surface 99.

The number of indexing lugs 100 and their location (radial and/or longitudinal) on the interior surface 99 can be varied. In general, about one to about five indexing lugs 100 can be utilized and their position on the interior surface 99 can be staggered in such a manor to act as an alignment key that enables the filter cartridge 22 to only be inserted into the receiving bore 98 in one angular position. Alternatively, additional flanges or tabs can project from the interior surface 99, which form a guide that allow the cam tracks 102 on the filter cartridge 22 to be inserted into the manifold 21 in only one angular position.

Filter Cartridge

Figure 10:
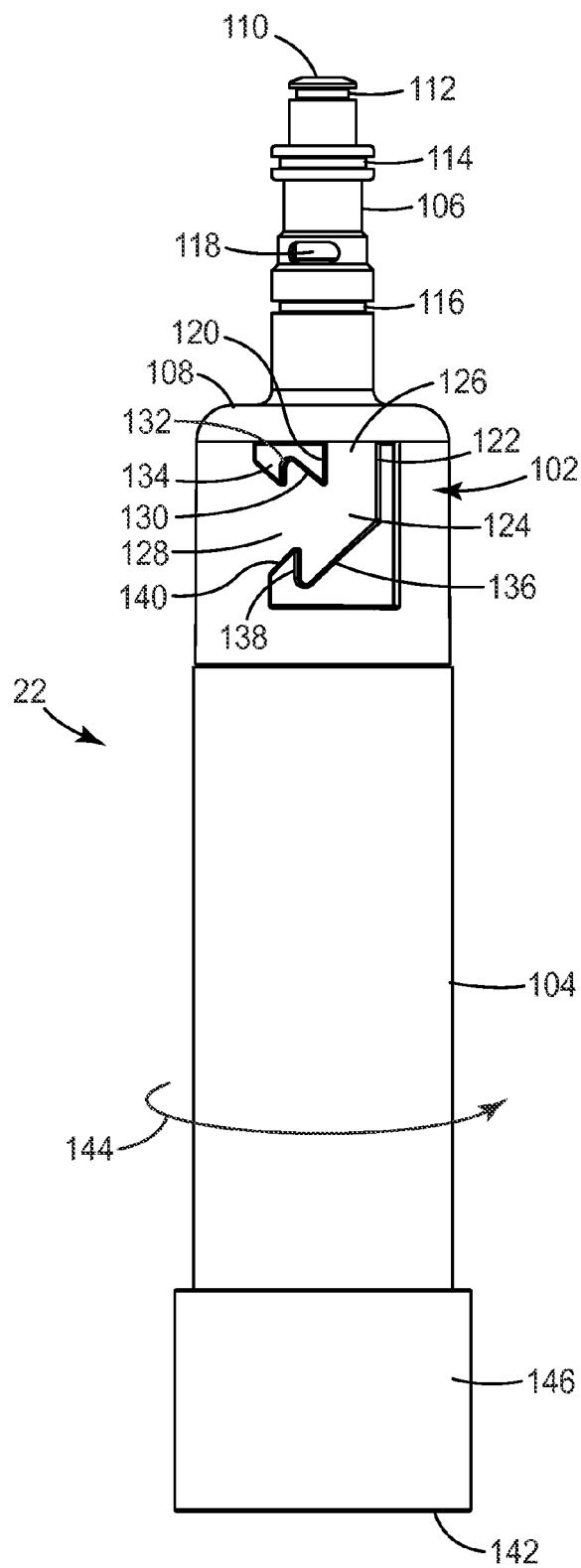
FIG. 10 is a front view of a filter cartridge.

Referring to FIG. 10, the filter cartridge 22 in one embodiment includes an outer shell 104 having a stem 106 disposed on a first cartridge end 108. The stem 106 includes an inlet bore 110 at the distal end, a first sealing groove 112, a second sealing groove 114, and a third sealing groove 116 spaced along its length. Sealing rings 60 (not shown) are positioned in the sealing grooves. The first sealing groove 112 and sealing ring 60 are sized to mate with the outlet bore 48 of the valve cartridge 34. The second and third sealing grooves (114, 116) and sealing rings 60 are sized to mate with the central bore 40 of the valve body 30. Disposed between the first and the second sealing grooves (112, 114) on the stem 106 is an outlet slot 118. The outlet slot 118 is positioned to be in fluid communication with the valve body outlet bore 78 with the filter cartridge 22 seated in its service position. Thus, once the stem 106 is inserted into the manifold 21, the inlet bore 110 displaces the poppet valve 52 and sealing ring 60 from the valve seat 62 allowing fluid to enter the filter cartridge 22 through the inlet bore 110. Simultaneously, the outlet slot 118 is brought into fluid communication with the valve body outlet bore 78 allowing fluid to exit the filter cartridge 22 through the outlet slot 118. Leakage of fluid is prevented by the sealing rings 60 located along the length of the stem 106.

The outer shell 104 in one embodiment can include at least one cam track 102 for engagement with the indexing lugs 100. In one embodiment, the cam track 102 includes a first opposing surface 120 and a second opposing surface 122 that form a channel 124 through which the indexing lug 100 traverses. The first and second opposing surfaces (120, 122) can be raised from the surface of the outer shell 104 as shown or the opposing surfaces can be recessed into the surface of the outer shell 104.

The channel 124 includes an entry portion 126 and an exit portion 128 in the direction of travel through the channel 124. The entry portion 126 engages with the indexing lug 100 when the filter cartridge 22 is first positioned into the coupling bracket 26. The indexing lug 100 exits through the exit portion 128 when the filter cartridge 22 is removed from the coupling bracket 26. The cam track's first opposing surface 120 includes an optional first upper advancing cam 130 positioned prior to a locating detent 132 and an optional second upper advancing cam 134 positioned after the locating detent 132 in the direction of travel from the entry portion 126 to the exit portion 128. The cam track's second opposing surface 122 includes a first advancing cam 136 positioned prior to an indexing stop 138 and a second advancing cam 140 positioned after the indexing stop 138 in the direction of travel from the entry portion 126 to the exit portion 128.

The indexing lugs 100 and cam tracks 102 cooperate such that by pushing on the second cartridge end 142 of the filter cartridge 22 a first time, the filter cartridge 22 is advanced and rotated into the service position. When the filter cartridge 22 is released, it is locked into the service position by the indexing lug 100 seating in the locating detent 132. By pushing on the second cartridge end 142 a second time, the filter cartridge 22 is advanced and continues to rotate in the same direction as during the initial installation and, as it is released, it disengages from the service position.

The above movement is achieved by the indexing lugs 100 and cam tracks 102 in the following sequence. The indexing lug 100 enters the cam track 102 at the entry portion 126. As the indexing lug 100 traverses further into the entry portion 126 it engages the first advancing cam 136 that rotates the filter cartridge 22 in a first direction 144. The filter cartridge 22 rotation continues until the indexing lug 100 abuts the indexing stop 138. At this point, installation force on the second cartridge end 142 can be released and the compression spring 33 moves the filter cartridge 22 axially off of the indexing stop 138. The indexing lug 100 then engages the optional first upper advancing cam 130 that continues to rotate the filter cartridge 22 in the first direction 144 until the indexing lug 100 engages with the locating detent 132 whereupon further rotation due to the force of the compression spring 33 is prevented and the filter cartridge 22 is locked into the service position.

To remove the filter cartridge 22, the second cartridge end 142 is pushed a second time to overcome the force of the compression spring 33 whereupon the indexing lug 100 engages the second advancing cam 140 which rotates the filter cartridge 22 in the first direction 144 a sufficient amount to clear the indexing lug 100 from the locating detent 132. As the force on the second cartridge end 142 is released, the compression spring 33 moves the filter cartridge 22 axially away from the second opposing surface 122 whereupon the indexing lug 100 engages the optional second upper advancing cam 134 that continues rotating the filter cartridge 22 in the first direction 144 sending the indexing lug 100 into the exit portion 128 such that the filter cartridge 22 can be removed from the coupling bracket 26.

As mentioned, the first upper advancing cam 130 and the second upper advancing cam 134 are optional. One or both of these cam surfaces can be eliminated such that the first opposing surface 120 includes only the locating detent 132 or only the locating detent 132 and one of these cam surfaces. By designing sufficient rotational advancement into the first and/or the second advancing cams (136, 140), additional rotation provided by the optional upper advancing cams is not required. It is believed that smoother filter cartridge 22 installation and more reliable operation is provided when utilizing the optional upper advancing cams as described.

In one embodiment, two cam tracks 102 located 180 degrees apart on the outer shell 104 were used. The first advancing cam 136, the second advancing cam 140, the first upper advancing cam 130, and the second upper advancing cam 134 on each cam track 102 comprised a linear ramp profile. The angle of the linear ramp was adjusted to facilitate a smooth transition and rotation of the filter cartridge 22 within the manifold 21 while recognizing the linear travel constraints of the filter cartridge 21 within the manifold 21. In other embodiments, harmonic, cycloid, modified harmonic, trapezoidal, modified trapezoidal, and polynomial cam profiles can be used. Spline curves can be used to design the appropriate cam profile.

The filter cartridge 22 also includes filtration media housed by the cartridge and, in one embodiment, an end cap 146. The end cap 146 can be connected to the outer shell 104 by a rotatable connection. For example, the end cap 146 can include a central hole that snaps over a pin extending from the filter cartridge 21. In this manor, the filter cartridge 22 is freer to rotate as the end cap 146 is pushed when the filter cartridge 22 is replaced.

In another embodiment, the end cap 146 is rotationally attached by a helix or a cam surface such that linear force on the end cap 146 biases the outer shell 104 to rotate in the first direction 144. The helix or cam located on the second cartridge end 142 can assist the cam track 102 in rotating the filter cartridge 22 into and out of the service position.

While the cam tracks 102 have been disclosed as positioned on the outer shell 104 and the indexing lugs 100 as positioned on the interior surface 99, the location of these components can be switched. For example, the cam tracks 102 can be located on the interior surface 99 and the indexing lugs 100 on the outer shell 104. Alternatively, one indexing lug 100 and one cam track 102 can be positioned on the interior surface 99 and a corresponding cam track 102 and indexing lug 100 located on the outer shell 104. Alternating positioning of the components as described acts as an alignment key for the filter cartridge 22.

The various parts of the liquid filtration system 20 and, in particular, the coupling bracket 26 and the filter cartridge 22 as described above may be constructed from any suitable material having adequate strength and manufacturability. Examples of suitable materials include polypropylene, polystyrene, nylon, and various polyphenylene ether compounds.

It is also envisioned that, in applications requiring greater strength, for example, parts may be constructed of metals such as stainless steel and aluminum.

Other modifications and variations to the present invention may be practiced by those of ordinary skill in the art, without departing from the spirit and scope of the present invention, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in a consistent manner. In the event of inconsistencies or contradictions between the incorporated references and this application, the information in the preceding description shall control. The preceding description in order to enable one of ordinary skill in the art to practice the claimed invention is not to be construed as limiting the scope of the invention, which is defined by the claims and all equivalents thereto.

What is claimed is:

1. A filter cartridge comprising:
   an outer shell having a first cartridge end and a second cartridge end, an inlet and an outlet located on the first cartridge end, and at least one cam track located on the outer shell;
   the at least one cam track comprising a first opposing surface and a second opposing surface forming a channel having an entry portion and an exit portion;
   the first opposing surface comprising a first upper advancing cam to advance an indexing lug through the channel and a locating detent to engage the indexing lug and to lock the filter cartridge in a service position, wherein the first upper advancing cam is located before the locating detent in the direction of travel from the entry portion to the exit portion;
   the second opposing surface comprising a first advancing cam and a second advancing cam to advance the indexing lug through the channel, wherein the first advancing cam is positioned before an indexing stop and the second advancing cam is positioned after the indexing stop in a direction of travel from the entry portion to the exit portion; and
   wherein the locating detent of the first opposing surface is positioned axially away from and after the indexing stop of the second opposing surface in the direction of travel from the entry portion to the exit portion.

2. The filter cartridge of claim 1 wherein the first opposing surface comprises a second upper advancing cam located after the locating detent in the direction of travel from the entry portion to the exit portion.

3. The filter cartridge of claim 1 comprising two cam tracks on the outer shell located 180 degrees apart; each cam track comprising the first opposing surface and the second opposing surface forming the channel having the entry portion and the exit portion; the first opposing surface comprising the locating detent; and the second opposing surface comprising the first advancing cam positioned before the indexing stop and the second advancing cam positioned after the indexing stop in the direction of travel from the entry portion to the exit portion.

4. The filter cartridge of claim 1 wherein the first advancing cam and the second advancing cam comprise linear ramps.

5. The filter cartridge of claim 1 wherein the second cartridge end comprises a cap having a rotatable connection to the second cartridge end.

6. The filter cartridge of claim 5 wherein the rotatable connection comprises a cam or a helix positioned between the cap and the second cartridge end.

7. The filter cartridge of claim 1 comprising a stem attached to the first cartridge end, and the stem is positioned in a manifold comprising a valve assembly and a coupling bracket.

8. The filter cartridge of claim 7 wherein the coupling bracket comprises a first end, a second end, and a sidewall; the second end of the coupling bracket comprising a receiving bore for the filter cartridge, the receiving bore having an interior surface, and the interior surface comprising at least one indexing lug.

9. The filter cartridge of claim 8 wherein the at least one indexing lug comprises a triangular shape, the locating detent comprises an angled portion adapted to receive a first corner of the indexing lug comprising a triangular shape, the indexing stop comprises an angled portion adapted to receive a second corner of the indexing lug comprising a triangular shape, and the first corner of the indexing lug is positioned axially away from the second corner of the indexing lug.

10. The filter cartridge of claim 9 wherein the interior surface comprises two indexing lugs having the triangular shape and the two indexing lugs are positioned 180 degrees apart.

11. A method of installing the filter cartridge of claim 7 into the manifold comprising pushing on the second cartridge end a first time, thereby rotating the filter cartridge in a first direction into a service position.

12. A method of removing the filter cartridge of claim 11 from the manifold comprising pushing on the second cartridge end a second time, thereby continuing to rotate the filter cartridge in the first direction to remove the filter cartridge from the service position.

13. A filter system comprising
   a filter cartridge and a manifold;
   the filter cartridge comprising an outer shell having a first cartridge end and a second cartridge end, and a stem attached to the first cartridge end;
   the manifold comprising a valve assembly in fluid communication with the stem and a coupling block having a receiving bore with an interior surface, the receiving bore surrounding at least a portion of the outer shell;
   an indexing lug located on either the interior surface or the outer shell and a cam track located on the outer shell or the interior surface engaged with the indexing lug; and
   the cam track comprising a first opposing surface and a second opposing surface forming a channel having an entry portion and an exit portion; the first opposing surface comprising a first upper advancing cam to advance the indexing lug through the channel and a locating detent to engage the indexing lug and to lock the filter cartridge in a service position, wherein the first upper advancing cam is located before the locating detent in the direction of travel from the entry portion to the exit portion; the second opposing surface comprising a first advancing cam and a second advancing cam to advance the indexing lug through the channel, wherein the first advancing cam is positioned before an indexing stop and the second advancing cam is positioned after the indexing stop in a direction of travel from the entry portion to the exit portion; and wherein the locating detent of the first opposing surface is positioned axially away from and after the indexing stop of the second opposing surface in the direction of travel from the entry portion to the exit portion.

14. The filter system of claim 13 wherein the first opposing surface comprises a second upper advancing cam located after the locating detent in the direction of travel from the entry portion to the exit portion.

15. The filter system of claim 13 wherein the interior surface comprises the indexing lug and the outer shell comprises the cam track.

16. The filter system of claim 13 wherein the interior surface comprises the cam track and the outer shell comprises the indexing lug.

17. The filter system of claim 13 wherein the interior surface comprises the indexing lug and another cam track and the outer shell comprises the cam track and another indexing lug.

18. The filter system of claim 13 wherein the indexing lug comprises a triangular shape, the locating detent comprises an angled portion adapted to receive a first corner of the indexing lug comprising a triangular shape, the indexing stop comprises an angled portion adapted to receive a second corner of the indexing lug comprising a triangular shape, and the first corner of the indexing lug is positioned axially away from the second corner of the indexing lug.

19. A filter manifold that converts linear force into rotational motion to advance and secure a filter cartridge thereto comprising
   a valve assembly;
   a coupling block having a receiving bore with an interior surface; and
   a cam track located on the interior surface;
   the cam track comprising a first opposing surface and a second opposing surface forming a channel having an entry portion and an exit portion; the first opposing surface comprising a first upper advancing cam to advance an indexing lug through the channel and a locating detent to engage the indexing lug and to lock a filter cartridge in a service position, wherein the first upper advancing cam is located before the locating detent in the direction of travel from the entry portion to the exit portion; the second opposing surface comprising a first advancing cam and a second advancing cam to advance the indexing lug through the channel, wherein the first advancing cam is positioned before an indexing stop and the second advancing cam is positioned after the indexing stop in a direction of travel from the entry portion to the exit portion; and wherein the locating detent of the first opposing surface is positioned axially away from and after the indexing stop of the second opposing surface in the direction of travel from the entry portion to the exit portion.

20. A refrigerator comprising the filter manifold of claim 19.

21. The refrigerator of claim 20 further comprising a filter cartridge.

22. The refrigerator of claim 21 wherein the filter cartridge comprises
   an outer shell having a first cartridge end and a second cartridge end, at least a portion of the outer shell being receivable in the receiving bore;
   a stem attached to the first cartridge end for fluid communication with the valve assembly; and
   an indexing lug located on the outer shell for engaging with the cam track.

23. The filter system of claim 19 wherein the indexing lug comprises a triangular shape, the locating detent comprises an angled portion adapted to receive a first corner of the indexing lug having a triangular shape, the indexing stop comprises an angled portion adapted to receive a second corner of the indexing lug having a triangular shape, and the first corner of the indexing lug is positioned axially away from the second corner of the indexing lug.

* * * * *